(No Model.)

J. STROMBERG.
MICROMETER GAGE.

No. 570,189. Patented Oct. 27, 1896.

Witnesses:

Inventor:
John Stromberg,
By Dyrenforth & Dyrenforth,
Att'ys

UNITED STATES PATENT OFFICE.

JOHN STROMBERG, OF KENOSHA, WISCONSIN.

MICROMETER-GAGE.

SPECIFICATION forming part of Letters Patent No. 570,189, dated October 27, 1896.

Application filed May 14, 1896. Serial No. 591,468. (No model.)

*To all whom it may concern:*

Be it known that I, JOHN STROMBERG, a citizen of the United States, residing at Kenosha, in the county of Kenosha and State of Wisconsin, have invented a new and useful Improvement in Micrometers, of which the following is a specification.

My invention relates to improvements in micrometers of the class intended more especially for the use of machinists and employed as a caliber-gage for measuring and calipering lengths and diameters with microscopic exactness. In micrometers of this class it has been usual to provide a longitudinally-sliding register-bar mounted in one of the arms of the instrument and capable of being so adjusted with relation to the micrometer-screw as to meet the end of the same when the screw is at the inward limit of its traverse and permit objects of less than an inch to be measured, or to be withdrawn a certain distance, as an inch, from the end of the micrometer-screw to permit employment of the instrument in measuring objects of more than an inch. In the use of the instruments thus constructed errors in the taking of measurements are frequently made owing to the fact that the operator fails to move the sliding register-bar the full distance between its stops. My object is to overcome this objection to the micrometers hitherto provided and to provide a micrometer in which the relatively-fixed base or register-surfaces, from which distances are indicated by the scale at the micrometer-screw, will always be true.

Figure 1:
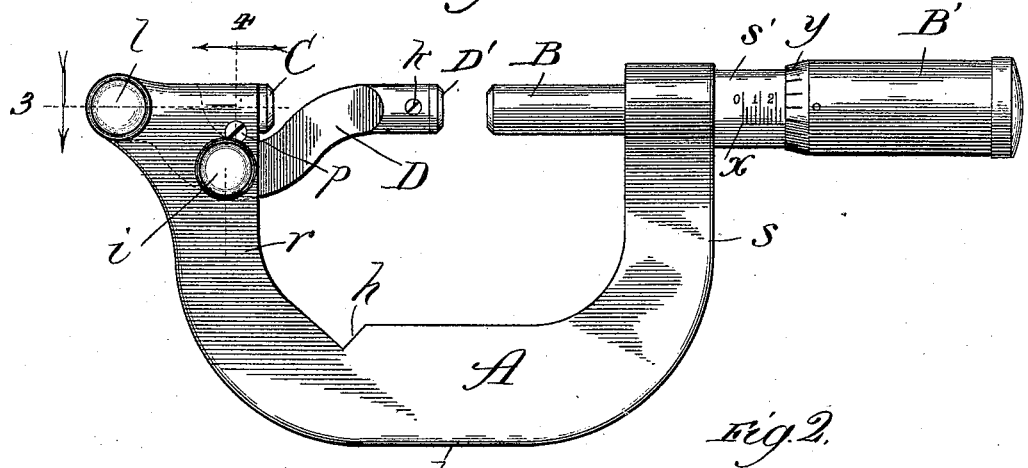
Figure 2:
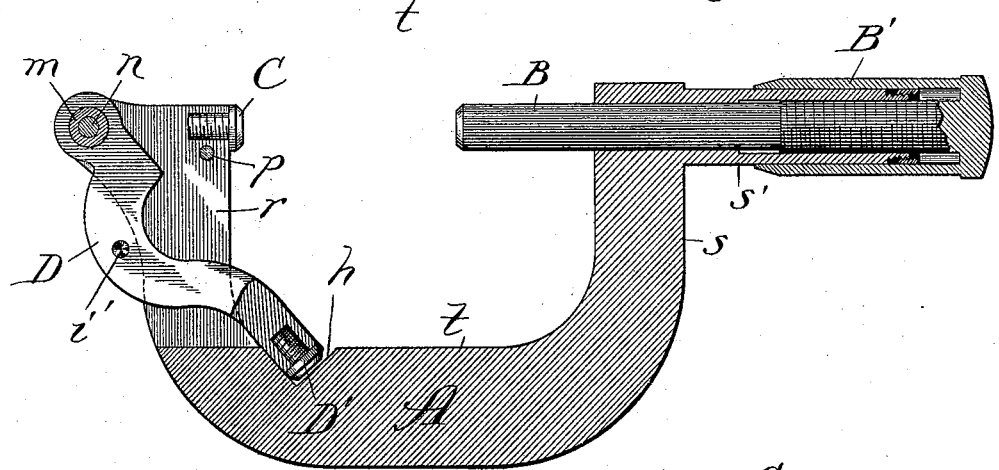
Figure 3:
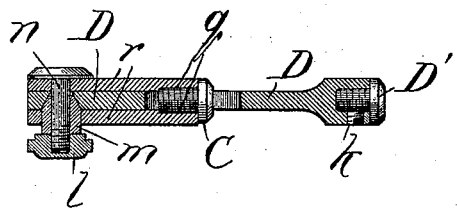
Figure 4:
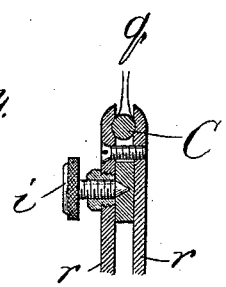

In the drawings, Figure 1 is a side view of a micrometer involving my invention and showing my improved swinging register-bar in position; Fig. 2, a longitudinal section of the same, showing the swinging register-bar turned out of position; Fig. 3, a plan section taken on line 3 of Fig. 1, and Fig. 4 a section taken on line 4 of Fig. 1 and viewed in the direction of the arrow.

A is the frame of the instrument, formed with the part $t$ and arms $s$ and $r$. On the arm $s$ is the tubular internally-threaded extension $s'$, provided on its outer side with the scale $x$, and working in the said tubular extension is the micrometer-screw B, provided with a sleeve portion B', having the scale $y$ and moving upon the tubular extension. The parts are commonly so constructed in instruments of this class that rotation of the sleeve B' the distance of one mark on the scale $y$ moves the screw the one-thousandth part of an inch, and one complete revolution of the sleeve moves the screw the twenty-five one-thousandths part of an inch. The micrometer-screw mechanism shown is common in instruments of this character, and it and the scales may be changed without affecting my improvements.

The arm $r$ is bifurcated, as shown, and provided in the adjacent surfaces of its forks with threaded recesses, forming a socket $q$, in line with the micrometer-screw B, for a register-screw C. Extending transversely through the forks of the arm $r$, adjacent to the socket $q$, is a clamping-screw $p$. The register-screw C should be so adjusted as to cause its face to extend the proper distance—just one inch—from the face of the screw B, when the zero-mark on the scale $y$ registers with the zero-mark on the scale $x$, and the screw C is held against turning in its socket by tightening the screw $p$, which clamps the forks tightly against the screw C.

D is a register-bar, preferably of the shape shown, and pivotally mounted at one end portion between the forks of the arm $r$. Extending through the forks is a screw or bolt $n$, on which is a sleeve $m$, having a tapering bearing-surface. The sleeve is confined in place by a nut $l$. The bar D has a tapering bearing-opening fitting the tapering sleeve, upon which it is adapted to swing between the positions shown in Figs. 1 and 2. In the free end of the bar D is a threaded socket, in which is fastened a register-screw D'. The screw D' is so adjusted in its socket that its face just meets the face of the micrometer-screw when the bar D is swung to the operative position shown in Fig. 1 and the micrometer-screw is at its initial position, wherein the zero-mark on the scale $y$ registers with the zero-mark on the scale $x$. The screw D' is tightened in position by means of a transverse set-screw $k$.

In one of the forks of the arm $r$ is a thumb-screw $i$, having a pointed end adapted to register with and engage a socket $i'$ in the bar D to lock the latter when it is swung into position. In the part $t$ is a recess $h$ to receive the end of the bar D when the latter is swung out of position.

In the use of the instrument, when it is desired to measure less than an inch, the register-bar D is swung into position and locked by means of the thumb-screw $i$, and when it is desired to measure an inch or over the bar D is swung to the position shown in Fig. 2, to be out of the way.

In the use of my improved instrument there is no danger of a false adjustment of the registering-surfaces at C or D', either through carelessness on the part of the operator or the lodgment of dust or the like between joints.

My improvements may be applied to micrometers of any size, and may be modified in the matter of details of construction without departing from the spirit of my invention as defined by the claims.

What I claim as new, and desire to secure by Letters Patent, is—

1. In a micrometer, the combination with the frame and adjustable micrometer-screw, of a register on the frame in permanent alinement with said screw, and a swinging register-bar whose operative position is between said register and screw, supported on the frame to be moved on its pivot into and out of operative position, substantially as and for the purpose set forth.

2. In a micrometer, the combination of the frame A, having an arm $s$ and bifurcated arm $r$, micrometer-screw mounted in the arm $s$, register C on the arm $r$, swinging register-bar D, pivotally supported between the forks of the arm $r$, and means for fastening the bar D in operative position, all arranged to operate substantially as and for the purpose set forth.

JOHN STROMBERG.

In presence of—
J. E. CORCORAN,
DANIEL B. BENEDICT.